United States Patent
Bich et al.

[11] Patent Number: 6,050,071
[45] Date of Patent: Apr. 18, 2000

[54] MODULAR STALKROLL WITH ONE BOLT ATTACHMENT

[75] Inventors: Gary L. Bich, New Holland; Dale M. Hurlburt, Landisville; James F. Rayfield, New Holland, all of Pa.

[73] Assignee: New Holland North America, Inc., New Holland, Pa.

[21] Appl. No.: 09/173,376

[22] Filed: Oct. 15, 1998

[51] Int. Cl.[7] ................................................. A01D 45/00
[52] U.S. Cl. ................................................. 56/52; 56/104
[58] Field of Search ................................ 56/14.2, 94, 98, 56/103, 104, 105, 51, 52, 62, 109, 110

[56] References Cited

U.S. PATENT DOCUMENTS

| | | | |
|---|---|---|---|
| 2,678,526 | 5/1954 | Voss | 56/104 |
| 2,744,375 | 5/1956 | Kidder | 56/104 |
| 2,927,414 | 3/1960 | Jones | 56/104 |
| 3,222,852 | 12/1965 | Ward et al. | 56/104 |
| 3,600,876 | 8/1971 | Tanzer | 56/11.2 X |
| 5,040,361 | 8/1991 | Briesemeister | 56/52 |

*Primary Examiner*—Robert E. Pezzuto
*Attorney, Agent, or Firm*—J. William Stader; Larry W. Miller; Frank A. Seemar

[57] ABSTRACT

The invention relates to a modular stalkroll for a corn head on a corn harvester. The apparatus consists of a drive shaft, fabricated stalkroll and a front auger. The drive shaft has several milled regions and a tapered region. The fabricated stalkroll has an upper and lower hub. The lower hub is inserted onto the drive shaft and is in contact with the tapered region. The upper hub has a drive shaft receptacle which receives the milled region of the drive shaft. The upper hub also has a female receptacle for receiving the front auger. A retaining bolt is inserted through the front auger and through the upper hub so as to clamp the front auger and fabricated stalkroll to the drive shaft. The fabricated stalkroll can be replaced by removing the single retaining bolt for either maintenance or replacement of a flute.

19 Claims, 5 Drawing Sheets

MODULAR STALKROLL WITH ONE BOLT ATTACHMENT

BACKGROUND OF INVENTION

1. Field of Art

This invention relates to the improvement of machines used in the harvesting of corn. More particularly, it relates to a stalkroll on a corn head.

2. Description of Prior Art

Mechanical harvesting of corn has taken place for decades. However, efforts continue to make corn harvest operations more efficient and effective. A corn harvester generally includes a corn head which removes the ears from the stalks. The ears of corn are then fed into a separator or thresher which separates the grains of corn from all other materials. A corn head actually consists of several corn head assemblies, one for each row which is being harvested in a single pass over the field. As the corn head moves forward, the corn plants in each row enter the forwardly extending channels. Generally the corn head includes a stripper plate with a slot which is wide enough to receive the corn stalk, but not wide enough for the stalk and an ear of corn to pass through. As the stripper plate moves forward, it exerts a forward and upward force on the ear.

Below the snapping plate in each corn head unit are a pair of stalkrolls the axis of which are parallel to the stripper plate slot and on each side of said stripper plate slot. These rolls rotate in opposite directions to one another engaging the stalk below the stripper plate. The directions of rotation are such as to exert a downward and rearward force on the stalk relative to the stripper plate. The generally opposing forces exerted by the rolls and plate on the stalk and ear snaps off the ear from the stalk. The ears and any trash are transported into the harvester or combine for further processing while the stalk generally remains rooted in the ground.

Stalkrolls generally have conical front ends (sometimes referred to as front augers) to provide a space for entry of the stalk and cylindrical rear ends (sometimes referred to as a fabricated stalkroll) which engage the stalk. The front end may be provided with helical flutes wound in opposite directions to drive the stalk rearwardly relative to the stripper plate. Usually the fabricated stalkrolls have circumferentially spaced, axially extending and radially projecting flutes which engage the stalk. The flutes on each roll are ordered in a manner so that the flutes intermesh in the manner of gears.

In conventional farming, the soil is tilled after the crop is harvested in the fall in order to break up the roots and stalks left in the field and again before planting of the next crop to provide loose soil for receiving the seed. Low till techniques seek to minimize the number of tillings in order to save on fuel costs for machinery, extend the life of machines, enable larger acreage to be tilled and save on labor costs by allowing for the same or smaller work force. Less tillage minimizes soil erosion and pollution of water in wells, aquifers and waterways. Less tillage minimizes the runoff of plant nutrients, unused commercial fertilizers, and herbicide residues. Less tillage and no till techniques, in particular, are believed to improve moisture retention in the soil aiding future crops because the residue left on the ground with these techniques acts as a mulch. The composting effect of the residue after it has decomposed may in the long-term reduce the need for commercial fertilizer. Low till and no till techniques are encouraged or required on some acreage by laws and regulations.

Depending on the tilling technique desired, it may be preferable to use a different stalkroll. For example, the flutes on a low till or no till acreage may be sharper than the flutes used on a stalkroll on conventional acreage. Sharper flutes or knives on a stalkroll will cut the stalk leaving this residue in a better position to decompose. However, to convert the flutes or knives on an existing stalkroll is a difficult and time-consuming task. Depending on the design, anywhere from 6 to 28 bolts per pair of stalkrolls must be removed. Further complicating the situation because stalkrolls are clamped to a drive shaft, rust will hold the stalkroll onto the shaft, requiring force to remove the roll. Further, many stalkrolls are a single cast design where the fabricated stalkroll and front auger are a single unit. However, the flutes on the fabricated stalkroll are the portion which wear down the quickest. Hence, a perfectly good front auger is disposed of while replacing a worn fabricated stalkroll flute or knife.

The prior art illustrates these and other deficiencies. Originally, the stalkrolls required a bearing support between the front auger and fabricated stalkroll as illustrated in U.S. Pat. No. 4,219,919 ('919). However, the bearings were prone to damage and failure if dirt entered the bearings. Furthermore, leaves and husks would tend to get caught and damage the bearing and bearing support elements. Bearing failure would ultimately result in the entire stalkroll failing. Another early stalkroll design is shown by U.S. Pat. No. 3,982,385 ('385). In this design, flutes were bolted directly to the drive shaft. This approach required a large number of bolts making replacement of the knives or flutes time consuming. Recently, the industry has started to use a cantilevered stalkroll and driving mechanism. The conventional stalkroll design in a cantilevered stalkroll system involves clamping two semi-circular halves horizontally around a centrally located drive shaft. U.S. Pat. Nos. 5,404, 699 ('699) and 5,040,361 ('361) disclose such an approach. Another difficulty with replacing any stalkroll is the occurrence of rust between the fabricated stalkroll and the drive shaft. Moisture frequently builds up between the stalkroll and drive shaft causing rust, further causing the stalkroll to adhere to the shaft. This adherence to the drive shaft makes removal of the stalkroll even more difficult. '361 has attempted to overcome this problem by a threaded socket (79) at the pinnacle of the front auger for the insertion of a removal device for forcing the shaft from the stalkroll. A final difficulty with all stalkrolls involves the maintenance of proper timing between a pair of stalkrolls. If the fabricated stalkrolls become misaligned, the flutes on the opposing stalkroll will improperly cut the stalk. In certain designs, a misalignment will result in catastrophic damage to the stalkroll. Patents '385 and '699 require perfect alignment in order to be effective in cutting stalks.

Consequently, the need exists for a stalkroll which is easy to remove from the drive shaft, which requires fewer attachment devices and for which the flutes can be easily replaced depending on the desired tillage conditions or wear of the flutes. It would be desirable for a stalkroll for which alignment between a pair of stalkrolls is simple.

OBJECTS OF THE INVENTION

It is an object of the present invention to provide a modular stalkroll which allows for the simplified replacement of the fabricated stalkroll.

It is a further object of the present invention to provide a single bolt to affix a stalkroll to the drive shaft of a corn head.

It is a further object of the present invention to provide a design which allows for an easy to substitute fabricated stalkroll on a drive shaft to obtain the desired tillage.

It is a further object of the present invention to provide a stalkroll which can be easily aligned relative to an opposing stalkroll.

It is a further object of the present invention to provide a stalkroll which can minimize the effect of rust adherence between the fabricated stalkroll and the drive shaft.

It is a further object of the present invention to provide a stalkroll which uses a conventional gear pull system to remove a rust adhered stalkroll.

SUMMARY OF THE INVENTION

The invention overcomes the deficiencies of the prior art. The invention provides a modular stalkroll which requires only a single bolt to be affixed to a drive shaft. The invention comprises a drive shaft, a fabricated stalkroll and a front auger. The drive shaft has two milled areas, a bolt receptacle and a tapered region. A fabricated stalkroll is inserted onto the drive shaft. Inside the stalkroll, there are affixed an upper hub and a lower hub. The tapered region of the drive shaft is inserted through the tapered region of the lower hub. The milled areas of the drive shaft are inserted into a drive shaft receptacle in the upper hub. The front auger has a male receptacle which is inserted into the upper hub. A single retaining bolt clamps to attach the front auger to the drive shaft, clamping the entire stalkroll together.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION OF THE INVENTION

Figure 1:
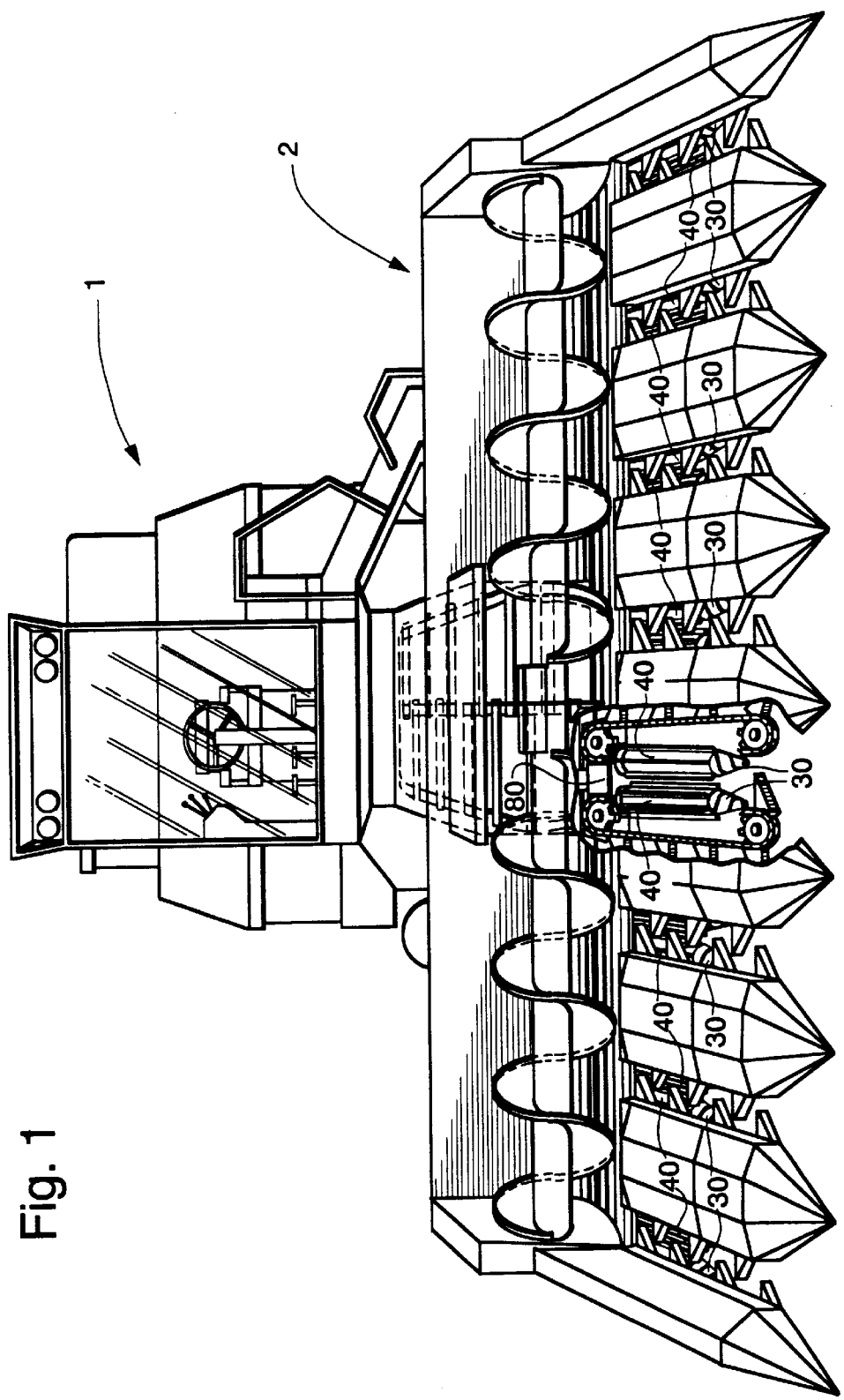
FIG. 1 is a general view of a corn harvester combine with a corn head containing the present invention.

Referring to the drawings, it is possible to observe the major elements and general operation of the present invention. FIG. 1 illustrates a conventional combine. Typically, there is a corn head 2 attached by the feeder house or elevator (shown in phantom lines) to a combine 1. The row dividers move between rows of corn and the corn stalks are drawn rearward by a front auger 30 and then cut by the stalkroll 40. The gathering chains feed the ear of corn backwards to a transverse auger. This auger moves the corn into the feeder house. The ears of corn are moved through the feeder house into a threshing system located in the combine 1. The corn kernels are then separated from the ear. The kernels of corn are then moved and stored in a grain tank located at the top of the combine. These are discharged later. The chaff or trash is discharged from the rear of the combine 1. An operator drives the combine from a glass cab with a chair and steering column. From the cab, the operator can observe most of the corn head 2 and combine 1 functions. The present invention is located on the front of the corn head 2. The modular stalkroll consists of a drive shaft 70, a fabricated stalkroll 40 and a front auger 30. These elements are clamped together to the drive shaft by a retaining bolt 20. Typically stalkrolls operate in pairs. Each stalkroll counter-rotates in a downward fashion relative to its pair. A stalk is drawn rearwardly by the front auger 30 toward the fabricated stalkroll 40 for cutting. The stalk is forced downward and cut by the fabricated stalkroll.

The drive shaft 70 is driven by a conventional drive means 80. See U.S. Pat. No. 4,222,218 for a disclosure on a conventional cantilevered gear and drive system for a stalkroll. The drive shaft 70 has several modifications to differentiate it from a conventional drive shaft. Each drive shaft has a first tapered region 74, a first milled area 71, a second milled area 72 and a bolt receptacle 73. Each milled area 71 and 72 is a portion of the shaft which has been milled so as to remove the drive shaft curvature. In the preferred embodiment, the milled areas are on opposing sides of the drive shaft 70. The bolt receptacle 73 is for receiving a threaded bolt (which will be discussed in detail later).

Figure 7:
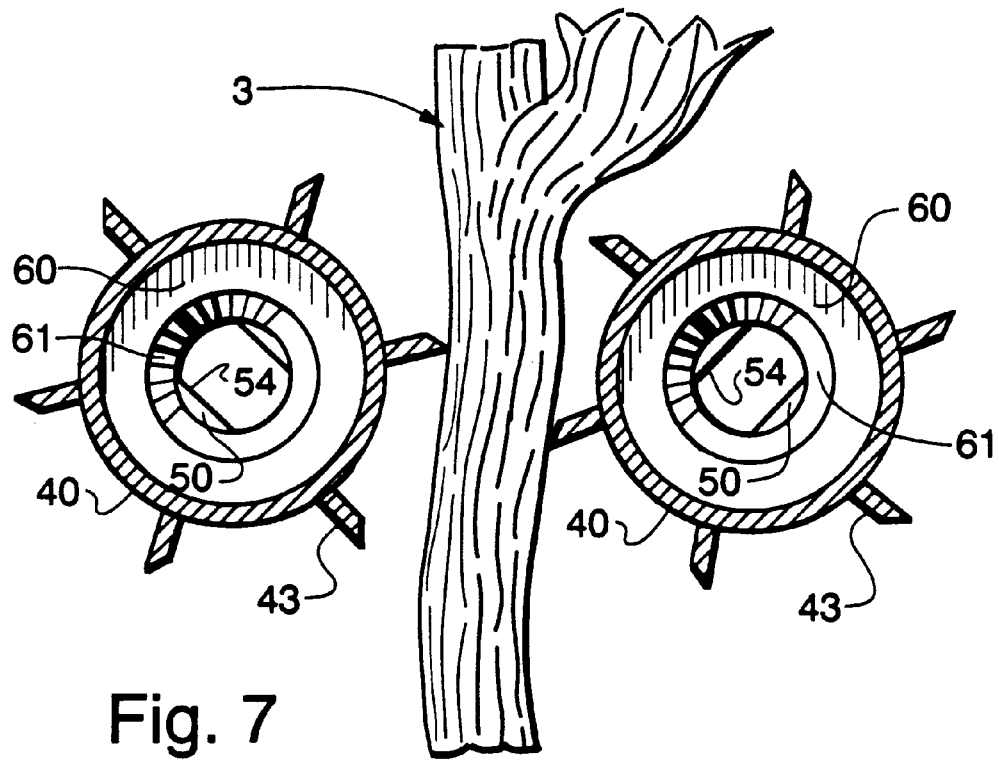
FIG. 7 is an enlarged sectional view taken along line 6—6 of FIG. 2 showing an alternative fluting embodiment and the drive shaft receptacle of the low r hub.
Figure 8:
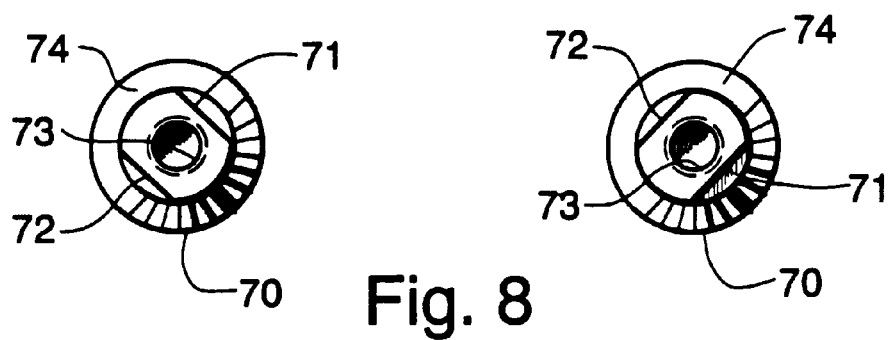
FIG. 8 is an enlarged sectional view taken along line 7—7 of FIG. 2 showing the drive shaft.

The circular stalkroll 40 has several flutes 43 spaced radially around its exterior circumference. Depending on the quality of cut required, the flutes can be flat or sharp. The interior of the stalkroll is hollow and contains an upper hub 50 and lower hub 60. These hubs have been affixed to the inner circumference of the fabricated stalkroll. The flutes 43 shown are standard roll flutes (which are flat), however knifes instead of flutes with a sharper cutting edge maybe used depending on the type of tillage desired. If different flutes or knives are desired, the fabricated stalkroll 40 is removed and another fabricated stalkroll with the desired knives or flutes are installed. Likewise, when a flute or knife becomes damaged or worn, the fabricated stalkroll can be replaced. A variety of knives can be placed on the fabricated stalkroll. The knives used are conventional stalkroll knives and are well known by the farming industry. As seen in FIG. 7, the knives are of sufficient sharpness to allow the stalk to be cut. These knives have been gaining popularity in corn harvesting operations. The knives are especially useful as more farmers use no till or low till farming techniques. The knives cut the stalk at a level proximate to the ground and also cut the stalk into smaller, easier to decompose pieces. This decreases the requirement for further tilling. (Decreasing tilling lessens soil moisture loss and requires less fertilizers). Because the fabricated stalkroll is easy to remove alternative knife designs can be experimented with. FIG. 7 illustrates a fabricated stalkroll with shape knifes 43 instead of flat flutes. A stalk 3 is positioned between the stalkrolls for cutting. Except for the different flute style (knife instead of flat), the stalkroll is identical.

The lower hub 60 is circular and has a tapering aperture in its center. The hub is affixed to the interior of the fabricated stalkroll. In the preferred embodiment the hub is affixed near the center of the fabricated stalkroll. This second tapered region 61 has a slope so as to match the tapering of the first tapered region 74 located on the drive shaft. The slope of the taper ranges from 5 to 15 degrees. The taper of first and second tapered regions 74 and 61 is designed to allow the fabricated stalkroll and drive shaft to be clamped in a vertical manner. This is contrasted with the prior art where the stalkrolls were affixed in a horizontal manner. The slight tapering allows for easier removal if moisture enters the fabricated stalkroll and rust causes adherence between the drive shaft 70 and the lower hub.

Figure 2:
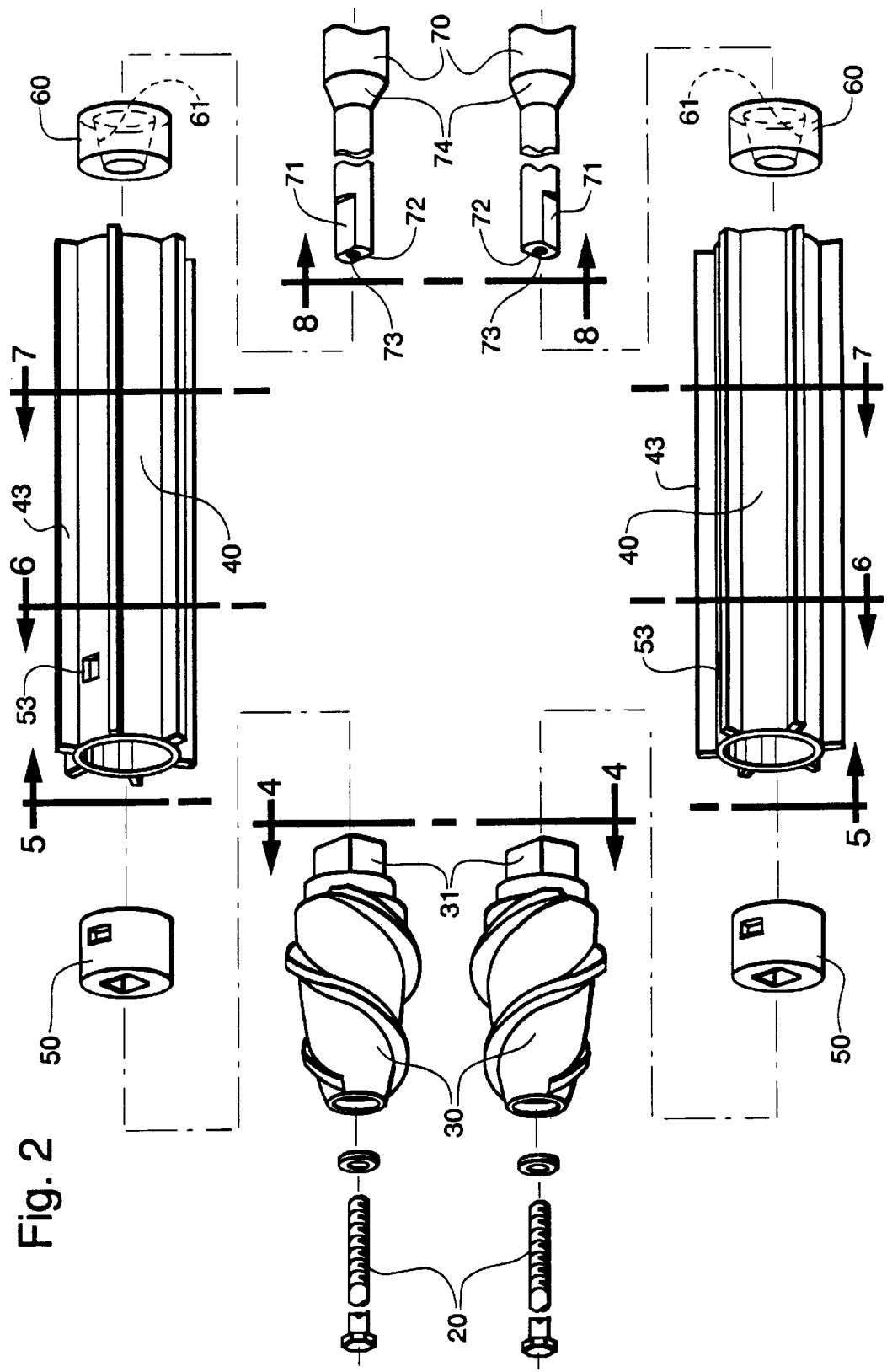
FIG. 2 is an exploded view of the stalkroll and drive shift of the present invention.
Figure 3:
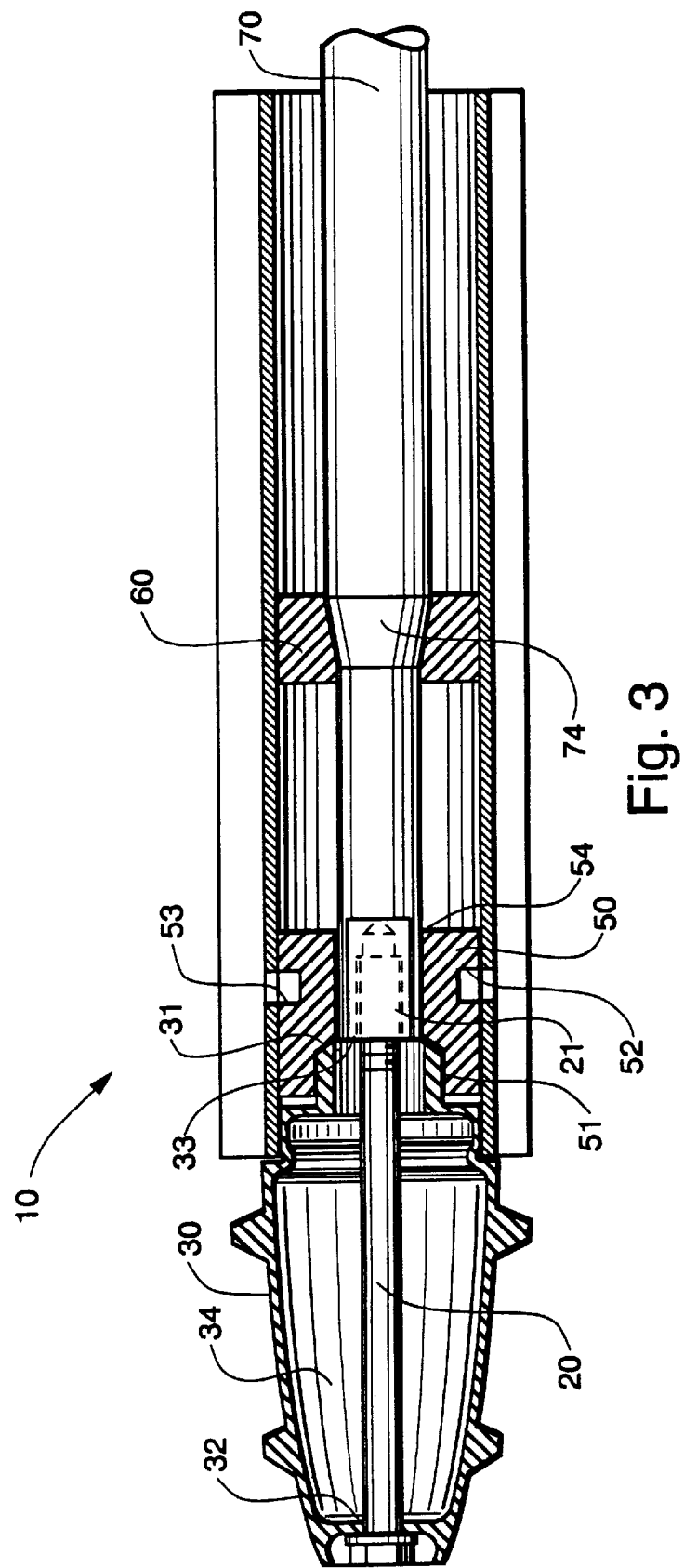
FIG. 3 is a cutaway view of the stalkroll.
Figure 4:
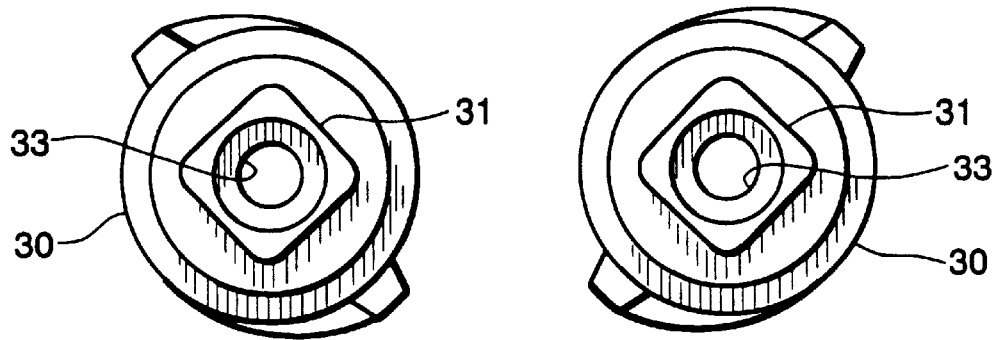
FIG. 4 is an enlarged sectional view taken along line 3—3 of FIG. 2 showing the male receptacle.
Figure 5:
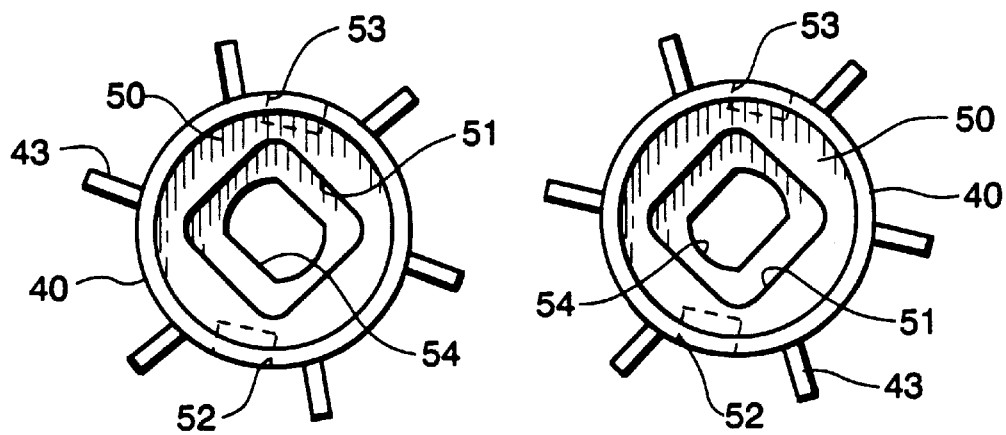
FIG. 5 is an enlarged sectional view taken along line 4—4 of FIG. 2 showing the female receptacle on the upper hub.
Figure 6:
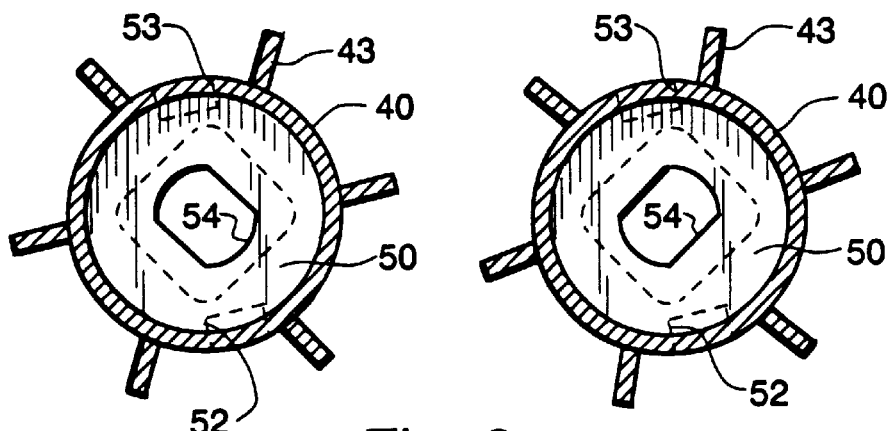
FIG. 6 is an enlarged sectional view taken along line 5—5 of FIG. 2 showing the drive shaft receptacle of the upper hub.

The upper hub 50 is designed to receive the front auger 30 and milled regions 71 and 72 of the drive shaft 70. The upper hub is also affixed to the interior of the fabricated stalkroll. In the preferred embodiment the upper hub is affixed on the end of the fabricated stalkroll farthest from the drive means 80. The upper hub 50 also has an aperture. On the portion of the hub facing the drive means 80, the aperture is designed to receive the milled areas 71 and 72. This drive shaft receptacle 54 is approximately rectangular shaped in the preferred embodiment. However, any receptacle which can tightly mesh with milled areas of the drive shaft is acceptable. On the portion of the hub facing the front auger 30, the aperture has a different shape which is designed to receive the male receptacle 31 of the front auger. In the preferred embodiment, this female receptacle 51 is rectangular, again any shape which can tightly mesh with the male receptacle of the front auger 30 is acceptable. If desired, gear pulls 52 and 53 can be placed in the upper hub. To aid in the removal of the stalkroll in the event of rust adherence, a pair of gear pulls aperatures 53 are positioned on the fabricated stalkroll (as seen in FIGS. 2 and 3). Aligned with the gear pull aperature is a gear pull slot 52 (as seen in FIG. 3) in the upper hub 50. A convention gear pull device can be used to remove the entire stalkroll. Such a gear pull could be similar to a Nesta Gripitite Jaw-style puller 6340K24 available from the McMaster-Carr Corporation. After the threaded bolt 20 is removed from the drive shaft 70, the claw of the puller would be inserted into the gear pull aperature 53 and gear pull slot 52. The puller would then be tightened and the stalkroll would separate from the drive shaft 70.

As previously mentioned, the front auger 30 has a rectangularly shaped male receptacle 31. As with conventional front augers, there is helical fluting so as to assist the stalk rearwardly into the fabricated stalkroll. The front auger is hollow 34 (also referred to as a void) and has two apertures 32 and 33. The two apertures are positioned on the auger such that a retaining bolt 20 can be inserted through the first aperture 32 in the auger through the void 34 and out the second aperture 33. The retaining bolt 20 continues through the female receptacle 51 into the upper hub 50. The threaded portion of the retaining bolt is inserted into the drive shaft receptacle and into the drive shaft. The first aperture 32 is at the pinnacle of the auger and the second aperture 33 is located in the male receptacle. The retaining bolt 20 has a threaded portion 21 which is received into the bolt receptacle 73. The preferred embodiment uses a retaining bolt, however a pin with a retaining mechanism located in the drive shaft could also suffice.

The assembly of the modular stalkroll 10 is accomplished by sliding the milled areas 71 and 72 of the drive shaft 70 through the lower hub 60 and into the drive shaft receptacle 54 of the upper hub 50. The male receptacle 31 of the front auger 30 is positioned into the female receptacle 51 of the upper hub. The retaining bolt 20 is inserted through the front auger, through the male and female receptacle 31 and 51 and in the bolt receptacle. As the bolt is tightened, the entire assembly wedged onto the drive shaft 70 because of the tapered region 74. In order to maintain the correct spacing between a pair of opposing fabricated stalkrolls, the milled regions 71 and 72 are oriented 90 degrees from the milled region of the opposing stalkroll drive shaft (71 and 72). Because the drive shaft receptacle 54 is rectangular, the fabricated stalkroll can only be inserted with correct orientation. The opposing stalkroll will be inserted at an orientation 90 degrees different. This ensures the proper alignment of a pair fabricated stalkrolls so as to avoid stalkroll timing problems.

It will be obvious to those skilled in the art that various changes may be made without departing from the scope of the invention and the invention is not to be considered limited to what is illustrated in the drawings and described in the specification.

What is claimed is:

1. A modular stalkroll for a corn head on a corn harvester, comprising:
   a. a drive shaft with a drive means, a first tapered region, a milled region and a bolt receptacle;
   b. a fabricated stalkroll and a plurality of flutes affixed thereon;
   c. a lower hub affixed to the fabricated stalkroll, said hub having a second tapered region in contact with the first tapered region;
   d. an upper hub affixed to the fabricated stalkroll, said upper hub having a female receptacle and a drive shaft receptacle, said drive shaft receptacle for receiving the drive shaft;
   e. a front auger with a male receptacle for insertion into the female receptacle;
   f. a retaining bolt which is inserted into the bolt receptacle
   g. said fabricated stalkroll having a gear pull aperature, therein, said upper hub having a gear pull slot, said gear pull slot and gear pull aperature aligned to assist in the removal of said modular stalkroll wherein the front auger has a void therein, said auger also having a pinnacle with a first aperture therein, said aperture connected to the void, said male receptacle having a second aperture therein, said second aperture connected to the void and aligned with the first aperture, whereby the retaining bolt passes through the first aperture, into the void then into the second aperture allowing the stalkroll and drive shaft to be clamped in a vertical manner.

2. The modular stalkroll as defined by claim 1, wherein the first tapered region has an angle in the range of 5 to 15 degrees and said second tapered region matches the angle of the first tapered region.

3. The modular stalkroll as defined by claim 2, wherein the male receptacle and female receptacle are a rectangular shape.

4. The modular stalkroll as defined by claim 3, wherein the milled region of the drive shaft is 90 degrees from an opposing stalkroll drive shaft, whereby the stalkroll will be properly aligned.

5. The modular stalkroll as defined by claim 3, wherein the milled region further comprises a first milled region and a second milled region.

6. The modular stalkroll as defined by claim 5 wherein the bolt has a threaded portion which is rotationally inserted into the bolt receptacle.

7. The modular stalkroll as defined by claim 6 wherein the upper hub has an upper hub aperture, therein, said aperture connecting the female receptacle and drive shaft receptacle, whereby the retaining bolt may reach the bolt receptacle.

8. The modular stalkroll as defined by claim 7 wherein the fabricated stalkroll is circular.

9. The modular stalkroll as defined by claim 8 wherein the first milled region is located opposite to the second milled region on the drive shaft.

10. The modular stalkroll as defined by claim 9, wherein the flutes or opposing stalkrolls will mesh like gears.

11. The modular stalkroll as defined in claim 10, wherein the flute is a flat flute.

12. The modular stalkroll as defined in claim 10, wherein the flute is a knife flute.

13. In a corn head having a plurality of forwardly extending row dividers operationally attached to a combine, each said row divider having a gathering chain, a stripper plate and a pair of counter-rotating stalkrolls positioned below said stripper plate to draw a corn stalk downwardly through said stripper plate to remove an ear of corn therefrom, each said stalkroll having a front auger and a fabricated stalkroll, said stalkroll being rotated by a drive shaft the improvement comprising:

a. said fabricated stalkroll having an upper hub with a female receptacle and a drive shaft receptacle, said drive shaft receptacle for receiving the drive shaft, said fabricated stalkroll having a gear pull aperature therein, said upper hub having a gear pull slot therein, said gear pull aperature and gear pull slot aligned to assist in the removal of said stalkroll;

b. said front auger having a male receptacle for insertion in the female receptacle; and c. a retaining bolt for securing the front auger to drive shaft.

14. The modular stalkroll as defined by claim 13, wherein there is a single retaining bolt for securing the front auger to the drive shaft.

15. The modular stalkroll as defined by claim 14, wherein the female receptacle and the male receptacle are rectangularly shaped.

16. The modular stalkroll as defined by claim 15, wherein the drive shaft has a first milled region and a second milled region on opposing sides of the drive shaft.

17. The modular stalkroll as defined by claim 16, wherein the drive first milled region and second milled region are inserted into the drive shaft receptacle.

18. The modular stalkroll as defined by claim 17, wherein the drive shaft has a first tapered region.

19. The modular stalkroll as defined by claim 18, wherein the fabricated stalkroll has a lower hub, said hub having a second taper region for receiving the first taper region.

* * * * *